US005956215A

United States Patent [19]

Schmalhorst et al.

[11] Patent Number: 5,956,215

[45] **Date of Patent: *Sep. 21, 1999**

[54] HIGH DENSITY THIN FILM COUPLED ELEMENT READ HEAD WITH SUPPORT ELEMENT TO PREVENT DAMAGE TO MAGNETORESISTIVE ELEMENT

[75] Inventors: Joseph M. Schmalhorst, Broomfield; Joseph E. Torline, Arvada; James C. Cates, Louisville, all of Colo.

[73] Assignee: Storage Technology Corporation, Louisville, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,533

[22] Filed: Aug. 12, 1997

[51] Int. Cl.[6] .......... G11B 5/39

[52] U.S. Cl. .......... 360/113

[58] Field of Search .......... 360/113, 126; 338/32 R; 324/252

[56] References Cited

U.S. PATENT DOCUMENTS

| | | | |
|---|---|---|---|
| 4,663,684 | 5/1987 | Kamo et al. | 360/113 |
| 5,329,413 | 7/1994 | Kondoh et al. | 360/113 |
| 5,422,571 | 6/1995 | Gurney et al. | 360/113 |
| 5,608,593 | 3/1997 | Kim et al. | 360/113 |
| 5,635,835 | 6/1997 | Mouchot et al. | 324/252 |
| 5,661,620 | 8/1997 | Saito et al. | 360/113 |
| 5,668,685 | 9/1997 | Soeya et al. | 360/113 |
| 5,680,282 | 10/1997 | Alhert et al. | 360/113 |
| 5,696,654 | 12/1997 | Gill et al. | 360/113 |
| 5,706,151 | 1/1998 | Smith | 360/113 |
| 5,731,936 | 3/1998 | Lee et al. | 360/113 |
| 5,768,071 | 6/1998 | Lin | 360/113 |
| 5,772,794 | 6/1998 | Uno et al. | 148/108 |

*Primary Examiner*—Jefferson Evans
*Attorney, Agent, or Firm*—Brooks & Kushman P.C.

[57] ABSTRACT

A reproducing element for use in a high density coupled element read head, and a method for manufacturing such an element are provided. The reproducing element includes an insulative layer and a magnetoresistive element in contact with the insulative layer. The reproducing element also includes a support element in contact with the magnetoresistive layer, the support element having a hardness sufficient to substantially prevent damage to the magnetoresistive element during mechanical processing and during movement of a tape across a surface of the magnetoresistive element. The method includes depositing an insulative layer on a substrate, and depositing a magnetoresistive material on the insulative layer, the magnetoresistive material forming a read element. The method also includes depositing a material on the read element, the material forming a support element and having a hardness sufficient to substantially prevent damage to the read element during mechanical processing or during movement of a tape across a surface of the read element.

4 Claims, 2 Drawing Sheets

22
26
20
18
24
16
14
12
TAPE

HIGH DENSITY THIN FILM COUPLED ELEMENT READ HEAD WITH SUPPORT ELEMENT TO PREVENT DAMAGE TO MAGNETORESISTIVE ELEMENT

TECHNICAL FIELD

The present invention relates to a thin film coupled element designed for use in a high linear density read head, and a method for manufacturing such a coupled element.

BACKGROUND ART

There are several ways to fabricate magnetoresistive (MR) sensors for read back of data on magnetic tape. In all cases, a bias method must be used in order to permit the sensor to operate in the linear portion of the MR curve. In some cases, two elements can be used at the same time, reading the same data, to reduce signal distortion by processing the signal differentially so that any nonlinearities arising from the shape of the MR curve are canceled out.

In a coupled element design, the two elements may be placed atop each other in close proximity. This allows the sensors to provide magnetic bias for each other, as well as providing the benefit of differential sensing capabilities for low distortion. The design has an added benefit of high output, since it is essentially two elements occupying the same space that one would under normal circumstances.

In order to achieve good performance at high densities, it is important that the head have good resolution characteristics. This, in turn, implies a narrow gap length and excellent gap surface condition. A narrow gap length is achieved by the intrinsic film design of the head and is determined by film thicknesses. Gap surface condition is determined by the mechanical lapping technique used, as well as the makeup of the films in the gap.

In the manufacture of a thin-film head, the read element is mechanically lapped to a fixed stripe height using techniques familiar to those skilled in the art. This processing and/or subsequent wear of the head when exposed to abrasive media can result in gouging, pulling out, smearing, or dishing of the gap area. In addition, the elements used to sense the recording data on tape can become recessed from the head surface. When such conditions occur, the linear density response (resolution) suffers.

As a result, there exists a need for a thin film coupled element high density read head design and method for manufacturing such a read head that overcome such problems and provide for good resolution characteristics. Such a read head and method for manufacturing that read head would provide for improving the condition of the gap area and ensuring that the MR sensors are not recessed from the head surface upon completion of the read head manufacturing process, and during read head operation.

SUMMARY OF THE INVENTION

Accordingly, a principle object of the present invention is to provide an improved multitrack coupled element read head with good resolution for application in high density magnetic recording.

Another object of the present invention is to provide an improved method for manufacturing such a multitrack coupled element read head.

According to the present invention, then, a reproducing element is provided for use in a high density coupled element read head. The reproducing element of the present invention comprises an insulative layer, and a magnetoresistive element in contact with the insulative layer. The reproducing element further comprises a support element in contact with the magnetoresistive layer, the support element having a hardness sufficient to substantially prevent damage to the magnetoresistive element during mechanical processing and during movement of a tape across a surface of the magnetoresistive element.

The present invention also provides a method for manufacturing a reproducing element for use in a high density coupled element read head. The method of the present invention comprises depositing an insulative layer on a substrate, and depositing a magnetoresistive material on the insulative layer, the magnetoresistive material forming a read element. The method further comprises depositing a material on the read element, the material forming a support element and having a hardness sufficient to substantially prevent damage to the read element during mechanical processing and during movement of a tape across a surface of the read element.

These and other objects, features and advantages will be readily apparent upon consideration of the following detailed description in conjunction with the accompanying drawings.

DETAILED DESCRIPTION OF THE INVENTION

Figure 1:
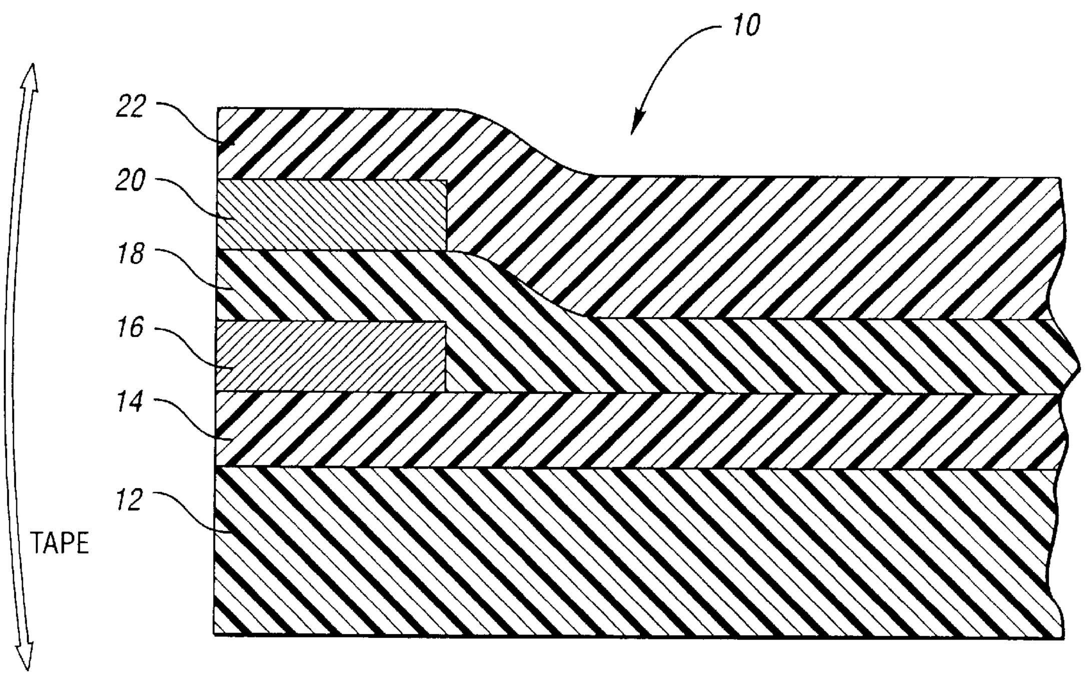
FIG. 1 is a cross-sectional view of an exemplary prior art coupled element reproducing head.
Figure 2:
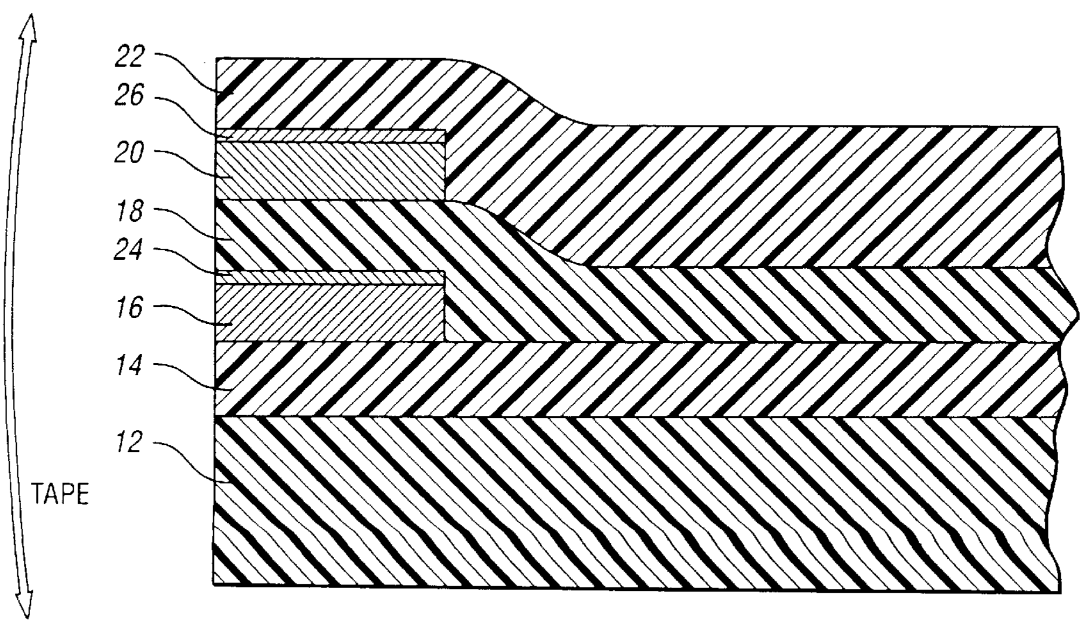
FIG. 2 is a cross-sectional view of an embodiment of one coupled element of the coupled element read head of the present invention manufactured according to the method of the present invention.

Referring now to FIGS. 1 and 2, the preferred embodiment of the present invention will now be described in detail. In that regard, FIG. 1 shows a cross-sectional view of an exemplary prior art coupled element (10) from a coupled element reproducing head.

As seen therein, coupled element (10) includes a substrate (12) having an insulative layer (14) deposited thereon. Substrate (12) is preferably a nickel-zinc (NiZn) ferrite alloy or other similar magnetic material known in the art for use as a substrate in thin film reproducing heads. Insulative layer (14) is preferably aluminum oxide or other similar material known in the art for use as an insulative layer in thin film reproducing heads.

Coupled element (10) also includes a sensor element (16) formed on insulative layer (14). Sensor element (16) comprises a magnetoresistive (MR) material and functions as part of a read element. MR sensor element (16) is formed according to known photolithographic processes including deposition and etching of a known MR material, which may be a nickel-iron alloy such as permalloy.

Still referring to FIG. 1, coupled element (10) further includes another insulative layer (18), also preferably aluminum oxide, deposited on MR sensor element (16) and on insulative layer (14). A second sensor element (20) is then formed on insulative layer (18). As with MR sensor element (16), sensor element (20) comprises a magnetoresistive (MR) material and functions as part of a read element. In that regard, first and second MR sensor elements (16, 20) together form a coupled element. Once again, MR sensor element (20) is formed according to known photolithographic processes including deposition and etching of a known MR material, which may be a nickel-iron alloy such as permalloy.

A final insulative layer (22) is deposited on MR sensor element (20) and insulative layer (18). To complete coupled element (10), a closure piece (not shown) of NiZn ferrite or other similar magnetic material known in the art is bonded to insulative layer (22). Those skilled in the art will recognize that a nonmagnetic material such as aluminum-titanium-carbide (AlTiC) or other similar material may be used for substrate (12) and the closure piece (not shown). In that case, a magnetic shield layer would be added between substrate (12) and insulative layer (14), and between insulative layer (22) and the closure piece (not shown). Such magnetic shield layers are deposited and patterned using standard processing techniques well known in the art.

While not visible in the cross-section of coupled element (10) shown in FIG. 1, coupled element (10) still further includes metallized interconnecting leads, which may be copper or a similar conductor and which are also formed by conventional photolithographic processes. Such interconnecting leads function as conductors of current to or from MR sensor elements (16, 20) during operation of coupled element (10).

As previously described, in the manufacture of a thin-film head, coupled element (10) is mechanically lapped to a fixed stripe height using techniques familiar to those skilled in the art. This processing and/or subsequent wear of coupled element (10) when exposed to abrasive media can result in gouging, pulling out, smearing, or dishing of the gap area. In addition, sensor elements (16, 20) used to sense the recorded data on tape can become recessed from coupled element (10) surface. When such conditions occur, the linear density response (resolution) suffers.

Referring now to FIG. 2, a cross-sectional view of the preferred embodiment of one coupled element of the coupled element read head of the present invention manufactured according to the method of the present invention is shown. In that regard, it should be noted that like reference numerals have been used for those portions of coupled element (10) similar to those shown in FIG. 1. With the design of coupled element (10) shown in FIG. 2, the problems associated with the prior art described above are overcome, and read head resolution is greatly enhanced.

More specifically, for the films of MR sensor elements (16, 20), the incorporation of very thin, hard, high resistance metal layers (24, 26) adjacent to MR sensor elements (16, 20), respectively, provides support and eliminates recession of MR sensor elements (16, 20) resulting from head finishing or operation. Like MR sensor elements (16, 20), metal layers (24, 26) are also fabricated according to known photolithographic processes. The thickness of metal layers (24, 26) is preferably approximately 50 to 200 angstroms.

The material of metal layers (24, 26) is preferably titanium, or other hard, high resistance metal such as tantalum or the like. In such a fashion, metal layers (24, 26) provide structural support without significantly increasing the size of coupled element (10), and thereby maintaining the resolutions required in high linear density read heads. Moreover, coupled element (10) may still be fabricated according to a full thin film process (including mechanical lapping) to again maintain high linear densities.

It should be noted that while the preferred embodiment of the present invention shown in FIG. 2 depicts a metal layer (24) associated with MR sensor element (16), and a metal layer (26) associated with MR sensor element (20), a single such metal layer may also be used with either MR sensor element (16, 20). Moreover, while the preferred location for metal layer (24) is between MR sensor element (16) and insulative layer (18) because of water processing issues, metal layer (24) could also be located between MR sensor element (16) and insulative layer (14) as shown in FIG. 3.

Figure 3:
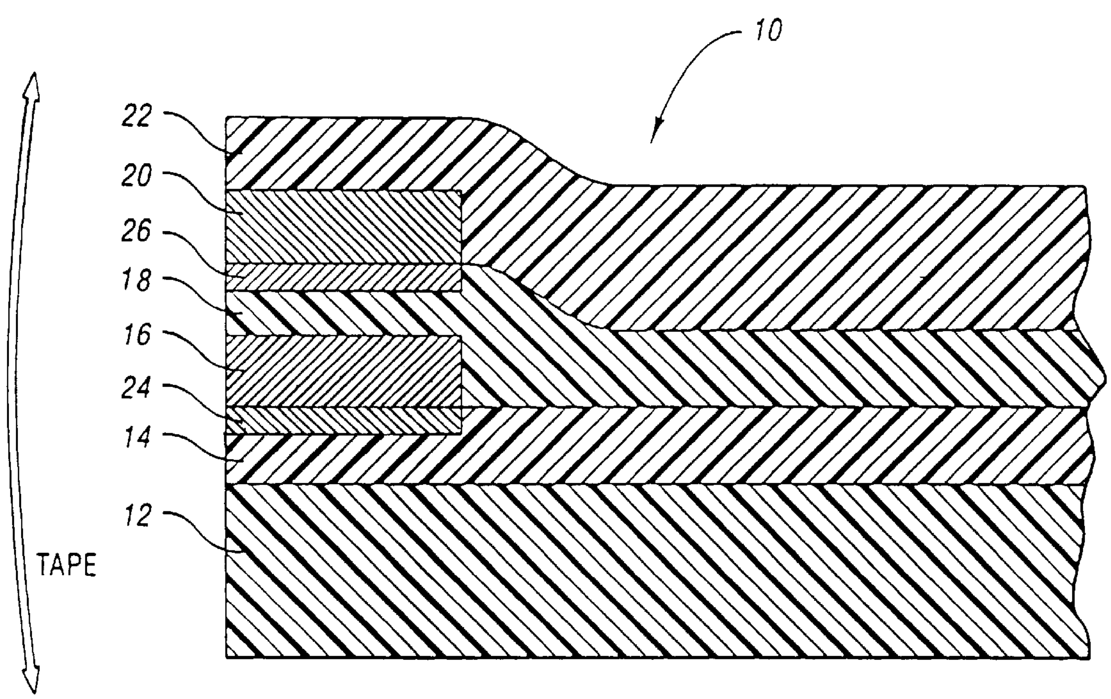
FIG. 3 is a cross-sectional view of a second embodiment of one coupled element of the coupled element read head of the present invention manufactured according to the method of the present invention.

Likewise, while for the same reason the preferred location for metal layer (26) is between MR sensor element (20) and insulative layer (22), metal layer (26) could also be located between MR sensor element (20) and insulative layer (18) as shown in FIG. 3. In that regard, with any embodiment of the present invention, the only requirement is that a metal layer or layers be located adjacent a MR sensor element or elements.

Finally, it should also be noted that while metal layers (24, 26) may also provide other benefits for MR sensor elements (16, 20) such as corrosion protection or electrical insulation, the primary purpose of metal layers (24, 26) is structural reinforcement. In that regard, metal layers (24, 26) provide no electrically conductive or magnetic function, nor do they interfere with any such function, in coupled element (10). Moreover, as the primary purpose of metal layers (24, 26) is structural, the material selected for metal layers (24, 26) should have sufficient hardness, and should be provided with sufficient thickness, to provides such structural reinforcement. In that regard, the preferred materials and thicknesses for metal layers (24, 26) were described above.

As is readily apparent from the foregoing description, then, the present invention provides an improved thin film coupled element for use in a high linear density read head, and a method for manufacturing such a coupled element. More specifically, the coupled element and the method for manufacturing the coupled element of the present invention provide a structure that serves to enhance resolution during both manufacture and use of a high linear density read head.

It should be noted, however, that the present invention is not limited to use in tape storage systems. In that regard, the thin film coupled element for use in high linear density read head and method for manufacturing such a coupled element of the present invention are also suitable for use in disk storage systems where high linear density heads are desired.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A reproducing element for use in a high linear density multitrack thin film coupled element read head comprising:

a first insulative layer;

a first magnetoresistive element in contact with the first insulative layer;

a first rigid metal support element in contact with the magnetoresistive element, the first metal support element being provided solely for mechanical support of the first magnetoresistive element without interfering with electrical and magnetic functions of the first magnetoresistive element and having a hardness sufficient to substantially prevent damage to the first magnetoresistive element during mechanical processing and during movement of a tape across the first magnetoresistive element, wherein the first metal support element comprises titanium or tantalum and has a thickness between approximately 50 angstroms and approximately 200 angstroms;

a second insulative layer in contact with the first support element;

a second magnetoresistive element in contact with the second insulative layer, the first and second magnetoresistive elements forming a coupled element and defining a gap, the gap consisting of the first metal support element and the second insulative layer; and a second rigid metal support element in contact with the second magnetoresistive element, the second metal support element being provided solely for mechanical support of the second magnetoresistive element without interfering with electrical and magnetic functions of the second magnetoresistive element and having a hardness sufficient to substantially prevent damage to the second magnetoresistive element during mechanical processing and during movement of a tape across the second magnetoresistive element, wherein the second metal support element comprises titanium or tantalum and has a thickness between approximately 50 angstroms and approximately 200 angstroms, wherein the first and second metal support elements provide the mechanical support of the first and second magnetoresistive elements without significantly increasing the size of the gap to maintain proper high linear density multitrack thin film coupled element read head resolution characteristics.

2. A method of manufacturing a reproducing element for use in a high linear density multitrack thin film coupled element read head, the method comprising:

providing a first insulative layer;

providing a first magnetoresistive element in contact with the first insulative layer;

providing a first rigid metal support element in contact with the first magnetoresistive element, the first metal support element being provided solely for mechanical support of the first magnetoresistive element and having a hardness sufficient to substantially prevent damage to the first magnetoresistive element during mechanical processing and during movement of a tape across the first magnetoresistive element, wherein the first metal support element comprises titanium or tantalum and has a thickness between approximately 50 angstroms and approximately 200 angstroms;

providing a second insulative layer in contact with the first support element;

providing a second magnetoresistive element in contact with the second insulative layer, the first and second magnetoresistive elements forming a coupled element and defining a gap, the gap consisting of the first metal support element and the second insulative layer; and providing a second rigid metal support element in contact with the second magnetoresistive element, the second metal support element being provided solely for mechanical support of the second magnetoresistive element without interfering with electrical and magnetic functions of the second magnetoresistive element and having a hardness sufficient to substantially prevent damage to the second magnetoresistive element during mechanical processing and during movement of a tape across the second magnetoresistive element, wherein the second metal support element comprises titanium or tantalum and has a thickness between approximately 50 angstroms and approximately 200 angstroms, wherein the first and second metal support elements provide the mechanical support of the first and second magnetoresistive elements without significantly increasing the size of the gap to maintain proper high linear density multitrack thin film coupled element read head resolution characteristics.

3. A reproducing element for use in a high linear density multitrack thin film coupled element read head comprising:

a first insulative layer;

a first rigid metal support element in contact with the first insulative layer;

a first magnetoresistive element in contact with the first metal support element, the first metal support element being provided solely for mechanical support of the first magnetoresistive element and having a hardness sufficient to substantially prevent damage to the first magnetoresistive element during mechanical processing and during movement of a tape across the first magnetoresistive element, wherein the first metal support element comprises titanium or tantalum and has a thickness between approximately 50 angstroms and approximately 200 angstroms;

a second insulative layer in contact with the first magnetoresistive element;

a second magnetoresistive element in contact with the second insulative layer, the first and second magnetoresistive elements forming a coupled element and defining a gap, the gap consisting of the second insulative layer; and a second rigid metal support element in contact with the second magnetoresistive element, the second metal support element being provided solely for mechanical support of the second magnetoresistive element without interfering with electrical and magnetic functions of the second magnetoresistive element and having a hardness sufficient to substantially prevent damage to the second magnetoresistive element during mechanical processing and during movement of a tape across the second magnetoresistive element, wherein the second metal support element comprises titanium or tantalum and has a thickness between approximately 50 angstroms and approximately 200 angstroms wherein the first and second metal support elements provide the mechanical support of the first and second magnetoresistive elements without increasing the size of the gap to maintain proper high linear density multitrack thin film coupled element read head resolution characteristics.

4. A method for manufacturing a reproducing element for use in a high linear density multitrack thin film coupled element read head, the method comprising:

providing a first insulative layer;

providing a first rigid metal support element in contact with the first insulative layer;

providing a first magnetoresistive element in contact with the first metal support element, the first metal support element being provided solely for mechanical support of the first magnetoresistive element and having a hardness sufficient to substantially prevent damage to the first magnetoresistive element during mechanical processing and during movement of a tape across the first magnetoresistive element, wherein the first metal support element comprises titanium or tantalum and has a thickness between approximately 50 angstroms and approximately 200 angstroms;

providing a second insulative layer in contact with the first magnetoresistive element;

providing a second magnetoresistive element in contact with the second insulative layer, the first and second magnetoresistive elements forming a coupled element and defining a gap, the gap consisting of the second insulative layer; and providing a second rigid metal support element in contact with the second magnetoresistive element, the second metal support element being provided solely for mechanical support of the second magnetoresistive element without interfering with electrical and magnetic functions of the second magnetoresistive element and having a hardness sufficient to substantially prevent damage to the second magnetoresistive element during mechanical processing and during movement of a tape across the second magnetoresistive element, wherein the second metal support element comprises titanium or tantalum and has a thickness between approximately 50 angstroms and approximately 200 angstroms, wherein the first and second metal support elements provide the mechanical support of the first and second magnetoresistive elements without increasing the size of the gap to maintain proper high linear density multitrack thin film coupled element read head resolution characteristics.

* * * * *